(12) United States Patent
Noda

(10) Patent No.: US 11,965,667 B2
(45) Date of Patent: *Apr. 23, 2024

(54) GENERATION METHOD, PROGRAM, INFORMATION PROCESSING APPARATUS, INFORMATION PROCESSING METHOD, AND TRAINED MODEL

(71) Applicant: DAIKIN INDUSTRIES, LTD., Osaka (JP)

(72) Inventor: Tomohiro Noda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/043,155

(22) PCT Filed: Sep. 2, 2021

(86) PCT No.: PCT/JP2021/032329
§ 371 (c)(1),
(2) Date: Feb. 27, 2023

(87) PCT Pub. No.: WO2022/050359
PCT Pub. Date: Mar. 10, 2022

(65) Prior Publication Data
US 2023/0228445 A1 Jul. 20, 2023

(30) Foreign Application Priority Data
Sep. 4, 2020 (JP) .................. 2020-149445

(51) Int. Cl.
G06N 20/00 (2019.01)
F24F 11/64 (2018.01)
(Continued)

(52) U.S. Cl.
CPC ................ *F24F 11/64* (2018.01); *G06N 5/04* (2013.01); *G06N 20/00* (2019.01);
(Continued)

(58) Field of Classification Search
CPC . G06N 20/00; G06N 5/04; F24F 11/64; F24F 2110/20; F24F 2140/60;
(Continued)

(56) References Cited

U.S. PATENT DOCUMENTS

2015/0356461 A1* 12/2015 Vinyals .................. G06N 20/00
706/12
2016/0012351 A1 1/2016 Sato
(Continued)

FOREIGN PATENT DOCUMENTS

JP H04-184668 7/1992
JP 2018-147474 9/2018
(Continued)

OTHER PUBLICATIONS

International Search Report for PCT/JP2021/032329 mailed on Oct. 12, 2021.
(Continued)

*Primary Examiner* — Dave Misir
(74) *Attorney, Agent, or Firm* — IPUSA, PLLC

(57) ABSTRACT

This disclosure aims to provide a technique for improving the accuracy of prediction. A first trained model for inferring labels for measurement data is generated based on a first data set. The first data set includes: combined data that are a combination of first measurement data, which are related to a first air conditioning apparatus, and labels set for the first measurement data; and second measurement data related to the first air conditioning apparatus.

8 Claims, 7 Drawing Sheets

(51) Int. Cl.
  *G06N 5/04* (2023.01)
  *F24F 110/10* (2018.01)
  *F24F 110/12* (2018.01)
  *F24F 110/20* (2018.01)
  *F24F 110/22* (2018.01)
  *F24F 140/00* (2018.01)
  *F24F 140/20* (2018.01)
  *F24F 140/50* (2018.01)
  *F24F 140/60* (2018.01)

(52) U.S. Cl.
  CPC ....... *F24F 2110/10* (2018.01); *F24F 2110/12* (2018.01); *F24F 2110/20* (2018.01); *F24F 2110/22* (2018.01); *F24F 2140/00* (2018.01); *F24F 2140/20* (2018.01); *F24F 2140/50* (2018.01); *F24F 2140/60* (2018.01)

(58) Field of Classification Search
  CPC ............... F24F 2140/00; F24F 2140/50; F24F 2110/22; F24F 2110/10; F24F 2110/12; F24F 2140/20; F24F 2130/20; F24F 2140/12; F24F 11/62; F24F 2120/10
  See application file for complete search history.

(56) References Cited

U.S. PATENT DOCUMENTS

| | | | | |
|---|---|---|---|---|
| 2018/0100662 | A1* | 4/2018 | Farahmand | G05B 19/0428 |
| 2018/0268262 | A1* | 9/2018 | Osada | G06F 18/2411 |
| 2019/0080089 | A1* | 3/2019 | Chen | G06N 20/10 |
| 2019/0101305 | A1 | 4/2019 | Hada et al. | |
| 2019/0242608 | A1 | 8/2019 | Laftchiev et al. | |
| 2019/0279039 | A1* | 9/2019 | Umeda | G06N 3/084 |
| 2019/0318261 | A1* | 10/2019 | Deng | G06V 10/82 |
| 2020/0012584 | A1* | 1/2020 | Walters | G06F 16/335 |
| 2020/0387847 | A1 | 12/2020 | Kawamura et al. | |
| 2021/0166679 | A1 | 6/2021 | Ando et al. | |
| 2021/0224323 | A1 | 7/2021 | Rezk | |

FOREIGN PATENT DOCUMENTS

| | | |
|---|---|---|
| JP | 2018-152004 | 9/2018 |
| JP | 2019-066135 | 4/2019 |
| JP | 2019-121141 | 7/2019 |
| JP | 2019-138602 | 8/2019 |
| JP | 2019-159576 | 9/2019 |
| JP | 2019-191769 | 10/2019 |
| JP | 2019-203670 | 11/2019 |
| WO | 2014/136316 | 9/2014 |
| WO | 2018/159666 | 9/2018 |
| WO | 2019/202724 | 10/2019 |
| WO | 2019/216938 | 11/2019 |
| WO | 2020/008365 | 1/2020 |
| WO | 2020/065970 | 4/2020 |

OTHER PUBLICATIONS

International Preliminary Report on Patentability for PCT/JP2021/032329 mailed on Mar. 16, 2023.
Office Action for U.S. Appl. No. 18/043,447 mailed on Jul. 19, 2023.
International Search Report for PCT/JP2021/032387 mailed on Nov. 22, 2021.
International Preliminary Report on Patentability for PCT/JP2021/032387 mailed on Mar. 16, 2023.
Extended European Search Report issued on Jan. 30, 2024 with respect to the related European patent application No. 21864422.7.
Office Action mailed on Nov. 9, 2023 issued respect to the related U.S. Appl. No. 18/043,447.

* cited by examiner

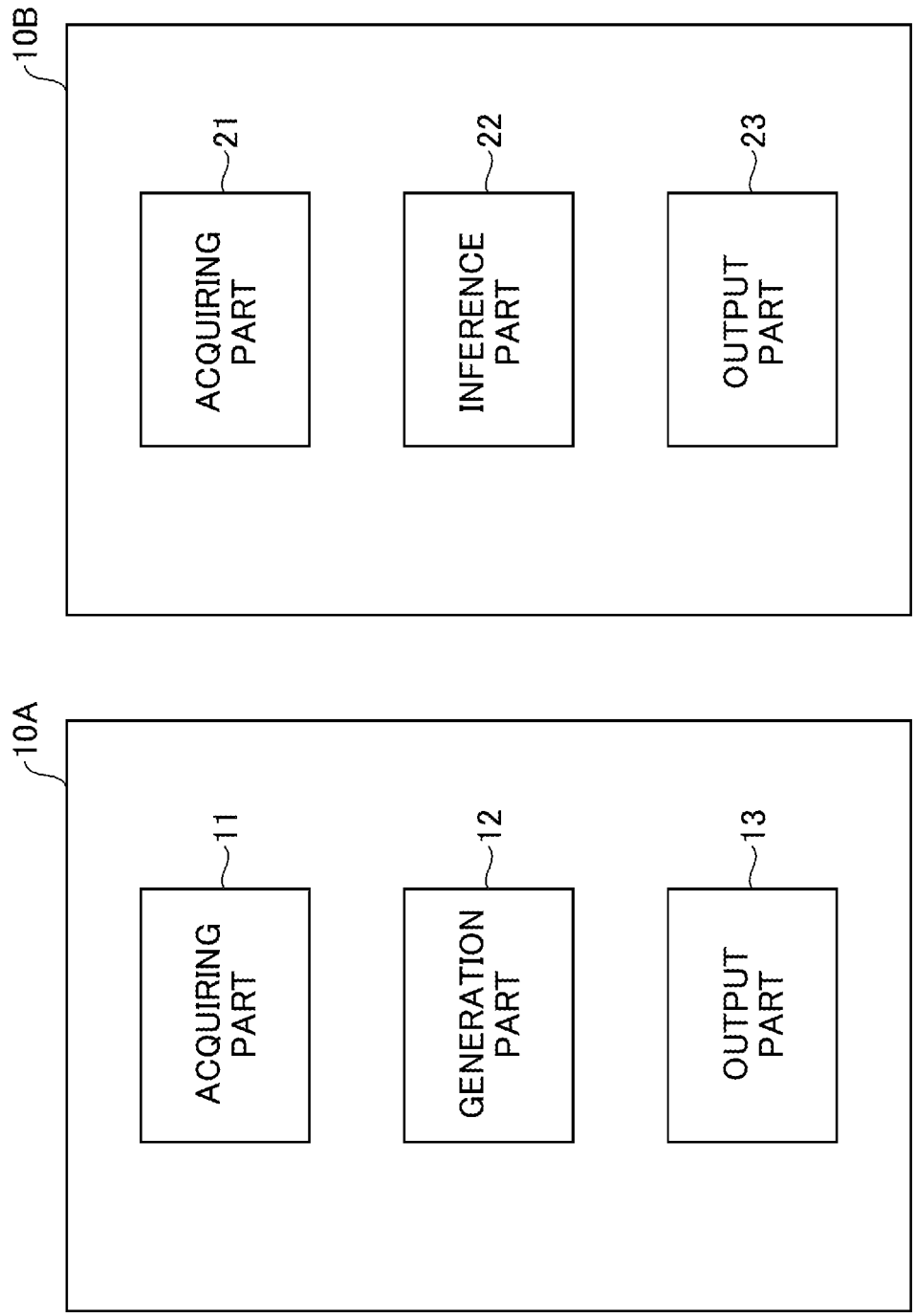

FIG.5

| MACHINE ID | DATE/TIME | MEASUREMENT DATA | GROUND-TRUTH LABEL |
|---|---|---|---|
| MACHINE A | DATE/TIME A1 | MEASUREMENT DATA A1 | GROUND-TRUTH LABEL A1 {511 |
|  | DATE/TIME A2 | MEASUREMENT DATA A2 | — } 512 |
|  | ... | ... | ... |
| MACHINE B | DATE/TIME B1 | MEASUREMENT DATA B1 | GROUND-TRUTH LABEL B1 {521 |
|  | DATE/TIME B2 | MEASUREMENT DATA B2 | — } 522 |
|  | ... | ... | ... |
| ... | | | |

501

GENERATION METHOD, PROGRAM, INFORMATION PROCESSING APPARATUS, INFORMATION PROCESSING METHOD, AND TRAINED MODEL

TECHNICAL FIELD

This disclosure relates to a generation method, a program, an information processing apparatus, an information processing method, and a trained model.

BACKGROUND ART

Conventionally, techniques for predicting various data by using machine learning are known. Patent document 1 discloses a technique for obtaining a desired training result that reflects multiple types of training data, without increasing the types of training data acquiring means.

RELATED-ART DOCUMENTS

Patent Documents

[Patent Document 1] Japanese Patent Application Publication No. 2018-147474

SUMMARY OF THE INVENTION

Problem to be Solved by the Invention

However, according to related art, when, for example, the amount of training data, in which data is assigned labels, is insufficient, cases might arise where it is not possible to learn for predicting with sufficient accuracy. This disclosure therefore aims to provide a technique that can improve the accuracy of prediction.

Means to Solve the Problem

In a generation method according to a first aspect of the present disclosure, an information processing apparatus performs a processes including: acquiring a first data set including combined data that are a combination of first measurement data, which are related to a first air conditioning apparatus, and labels set for the first measurement data, and second measurement data related to the first air conditioning apparatus; and generating, based on the first data set, a first trained model for inferring labels for measurement data. As a result, the accuracy of prediction can be improved.

Also, according to a second aspect of the present disclosure, in the generation method of the first aspect, a second data set including combined data that are a combination of third measurement data, which are related to a second air conditioning apparatus installed at a different location from the first air conditioning apparatus, and labels set for the third measurement data is acquired; and the first trained model for inferring labels for measurement data of the second air conditioning apparatus is generated based on the first data set and the second data set.

Also, according to a third aspect of the present disclosure, in the generation method of the second aspect, in the generation of the first trained model, mapping information that shows mapping of the first data set and the second data set is calculated, and the first trained model for inferring the labels for the measurement data of the second air conditioning apparatus is generated based on the first data set and the mapping information that shows the mapping.

Also, according to a fourth aspect of the present disclosure, in the generation method according to any one of the first to third aspects, a second trained model for inferring labels for measurement data of the first air conditioning apparatus and the second measurement data is generated based on the first trained model. The generated second trained model is lighter than the first trained model.

Also, according to a fifth aspect of the present disclosure, in the generation method according to any one of first to fourth aspects, the first measurement data includes at least one of room temperature, room humidity, outside temperature, outside humidity, information related to air-conditioning load, or information related to power consumption that pertains to the first air conditioning apparatus.

Also, according to a sixth aspect of the present disclosure, in the generation method according to any one of first to fifth aspects, the first measurement data includes at least one of a degree of opening of an expansion valve of an outdoor unit, a degree of opening of an expansion valve of an indoor unit, a value of a ratio between a predicted value of a current in a compressor and an actual measurement value, a degree of discharge superheat of the compressor, a degree of suction superheat of the compressor, or a temperature of a supercooling heat exchanger.

Also, a program according to a seventh aspect of the present disclosure causes an information processing apparatus to perform a process including: acquiring a first data set including combined data that are a combination of first measurement data, which are related to a first air conditioning apparatus, and labels set for the first measurement data, and second measurement data related to the first air conditioning apparatus; and generating, based on the first data set, a first trained model for inferring labels for measurement data.

Also, an information processing apparatus according to an eighth aspect of the present disclosure includes: an acquisition part configured to acquire a first data set including combined data that are a combination of first measurement data, which are related to a first air conditioning apparatus, and labels set for the first measurement data, and second measurement data related to the first air conditioning apparatus; and a generation part configured to generate, based on the first data set, a trained model for inferring labels for measurement data.

Also, an information processing apparatus according to a ninth aspect of the present disclosure includes: an acquisition part configured to acquire a trained model for inferring labels for measurement data, the trained model being generated based on a first data set, the first data set including combined data that are a combination of first measurement data, which are related to an air conditioning apparatus, and labels set for the first measurement data, and second measurement data related to the air conditioning apparatus; and an inference part configured to infer, based on the trained model, the labels for the measurement data.

Also, a program according to a tenth aspect of the present disclosure causes an information processing apparatus to perform a process including: acquiring a trained model for inferring labels for measurement data, the trained model being generated based on a first data set, the first data set including combined data that are a combination of first measurement data, which are related to an air conditioning apparatus, and labels set for the first measurement data, and second measurement data related to the air conditioning apparatus; and inferring, based on the trained model, the labels for the measurement data.

Also, an information processing method according to an eleventh aspect of the present disclosure an information processing apparatus performs a processes including: acquiring a trained model for inferring labels for measurement data, the trained model being generated based on a first data set, the first data set including combined data that are a combination of first measurement data, which are related to an air conditioning apparatus, and labels set for the first measurement data, and second measurement data related to the air conditioning apparatus; and inferring, based on the trained model, the labels for the measurement data.

Also, a trained model according to the twelfth aspect of the present disclosure is a trained model for causing a process for inferring labels for measurement data to be performed. The trained model being generated based on a first data set, the first data set including combined data that are a combination of first measurement data, which are related to an air conditioning apparatus, and labels set for the first measurement data, and second measurement data related to the air conditioning apparatus.

BRIEF DESCRIPTION OF DRAWINGS

FIG. 3 is a diagram that illustrates example functional structures of information processing apparatuses according to the embodiment;

FIG. 5 is a diagram that explains examples of training data according to the embodiment.

MODE FOR CARRYING OUT THE INVENTION

Figure 1:
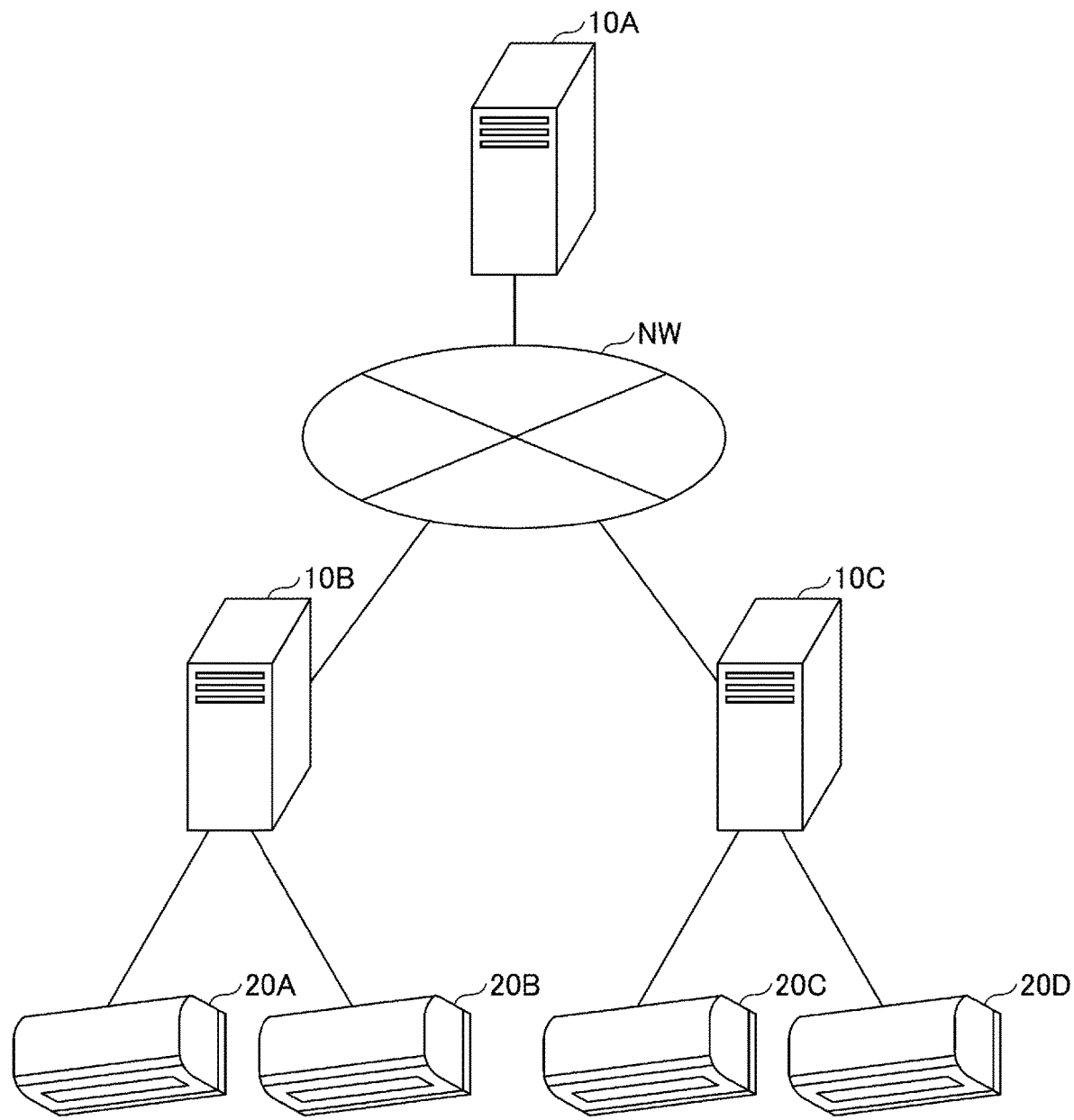
FIG. 1 is a diagram that illustrates an example system structure of an information processing system according to an embodiment.

Hereinafter, an embodiment of this disclosure will be described with reference to the accompanying drawings. Note that, in the present specification and drawings, components having substantially the same functional structure are assigned the same reference numerals to avoid redundant description.

<System Structure>

First, a system structure of an information processing system 1 will be described. FIG. 1 is a diagram that shows an example system structure of the information processing system 1 according to the embodiment. As shown in FIG. 1, the information processing system 1 includes an information processing apparatus 10A, an information processing apparatus 10B, and an information processing apparatus 10C (hereinafter, when there is no need to distinguish between them, they are simply referred to as "information processing apparatus(es) 10"). Also, the information processing system 1 includes a machine 20A (an example of "the first machine" and "the first air conditioning apparatus"), a machine 20B, a machine 20C, and a machine 20D (hereinafter, when there is no need to distinguish between them, they are simply referred to as "machine(s) 20"). The number of information processing apparatuses 10 and machines 20 is by no means limited to the example of FIG. 1. Note that the machine 20B, the machine 20C, and the machine 20D are each an example of a "second air conditioning apparatus."

The information processing apparatuses 10 and the machines 20 may be communicably connected with each other via a network NW such as the Internet, a wireless LAN (Local Area Network), a wired LAN, a mobile telephone network of LTE (Long Term Evolution), 5G or the like, and signal lines. The machines 20 may be installed, for example, in a residence, an office, a public facility, and the like. Each information processing apparatus 10 may be, for example, a cloud server. Also, each information processing apparatus 10 may be, for example, an edge server that is installed in a building where a plurality of machines 20 are installed. Furthermore, an information processing apparatus 10 may be, for example, accommodated in a machine 20 (for example, in the indoor unit casing of an air conditioning apparatus). Note that the information processing apparatus 10A, the information processing apparatus 10B, and the information processing apparatus 10C may be the same apparatus.

The machines 20 may be, for example, various machines such as an air conditioning apparatus (air conditioner), a refrigerator, a water heater, and lighting, and may include IoT (Internet of Things) devices that transmit various types of measured information, to the information processing apparatuses 10.

The machine 20A is a machine that is the target of inference by the information processing apparatus 10B. The machine 20A may be, for example, an air conditioning apparatus or the like that is installed in a newly contracted property. In this case, the machine 20A presumably started running only recently, and therefore a relatively small amount of ground-truth-labeled measurement data may be set so far for this machine 20A by a maintenance person or the like.

The machine 20B, the machine 20C, and the machine 20D may be each, for example, an air conditioning apparatus or the like designed for a different target space for air conditioning or the like, than the machine 20A. In this case, the indoor units of the machine 20B, the machine 20C, and the machine 205 may be installed in different rooms, facilities, or the like, from the indoor unit of the machine 20A.

The information processing apparatus 10A generates a trained model for making inferences about the measurement data of the machine 20A.

The information processing apparatus 10B uses the trained model generated by the information processing apparatus 10A, to make inferences about the measurement data of the machine 20A. The information processing apparatus 10B may be an edge server installed in the same facility as the machine 20A.

<Hardware Structure>

<<Hardware Structure of Information Processing Apparatus 10>>

Figure 2A:
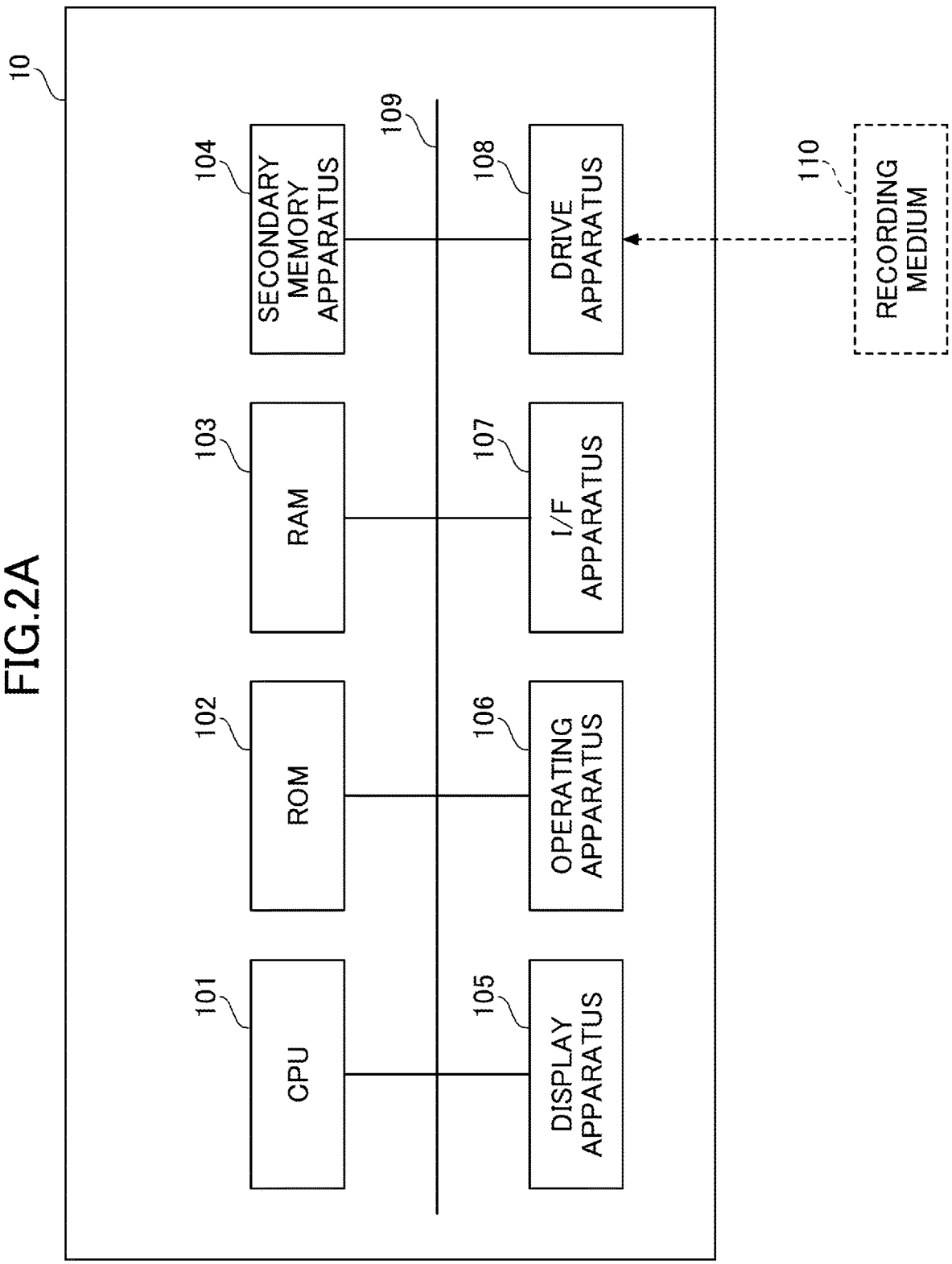
FIG. 2A is a diagram that illustrates an example hardware structure of an information processing apparatus according to the embodiment.

Next, the hardware structure of the information processing apparatus 10 according to the embodiment will be described. FIG. 2A is a diagram showing an example hardware structure of the information processing apparatus 10 according to the embodiment. As shown in FIG. 2A, the information processing apparatus 10 has a CPU (Central Processing Unit) 101, a ROM (Read Only Memory) 102, and a RAM (Random Access Memory) 103. The CPU 101, the ROM 102, and the RAM 103 form what is known as a computer. Also, the information processing apparatus 10 has a secondary memory apparatus 104, a display apparatus 105, an operating apparatus 106, an I/F (interface) apparatus 107, and a drive apparatus 108. Each piece of hardware of the information processing apparatus 10 is inter-connected via a bus 109.

The CPU 101 is an arithmetic device to execute various programs (for example, a machine learning program, or the like) installed in the secondary memory apparatus 104. The ROM 102 is a non-volatile memory. The ROM 102 functions as a main memory device, and stores various programs and data that the CPU 101 needs when executing various programs installed in the secondary memory apparatus 104. To be more specific, the ROM 102 stores boot programs such as BIOS (Basic Input/Output System), EFI (Extensible Firmware Interface), and so forth.

The RAM 103 is a volatile memory such as a DRAM (Dynamic Random Access Memory) or an SRAM (Static Random Access Memory). The RAM 103 functions as a main memory device, and provides a work area that expands when the CPU 101 executes various programs installed in the secondary memory apparatus 104.

The secondary memory apparatus 104 stores various programs, information for use upon execution of these programs, and so forth.

The display apparatus 105 is a display device that displays various information. The operating apparatus 106 is an operating device for entering various operations. The I/F apparatus 107 is a communication device for communicating with external machines.

The drive apparatus 108 is a device for setting a recording medium 110. The recording medium 110 here may be a medium such as a CD-ROM, a flexible disk, a magneto-optical disk, and so forth, which records information optically, electrically, or magnetically. Also, the recording medium 110 may include a semiconductor memory or the like that records information electrically such as a ROM, a flash memory, or the like.

Note that the various programs installed in the secondary memory apparatus 104 may be installed, for example, by setting the distributed recording medium 110 in the drive apparatus 108, and reading the various programs recorded in the recording medium 110 by means of the drive apparatus 108. Alternatively, the programs installed in the secondary memory apparatus 104 may be installed by being downloaded from a network (not shown).

<<Structure of Machines 20>>

Figure 2B:
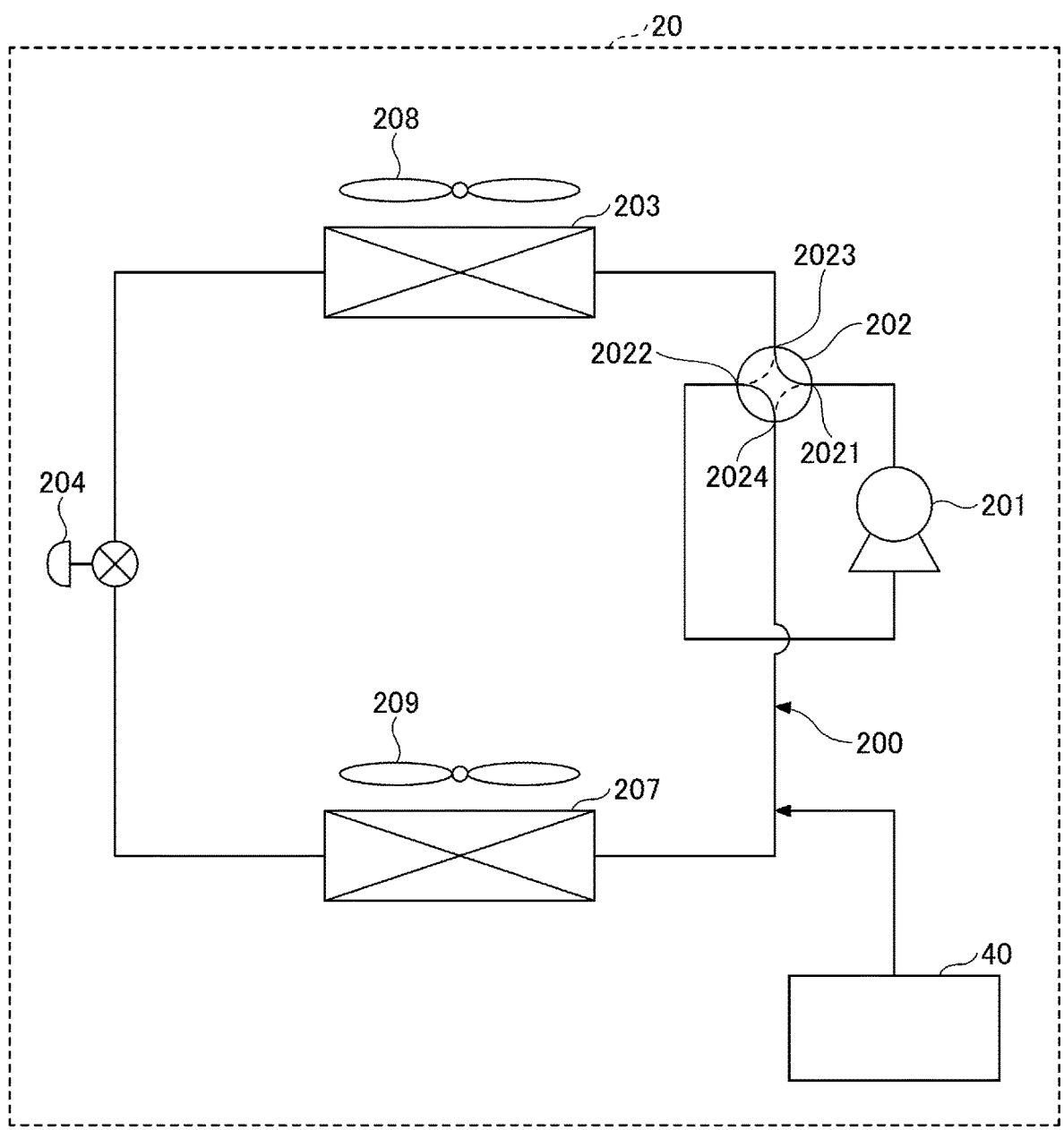
FIG. 2B is a diagram that illustrates an example structure of a machine according to the embodiment.

Next, the structure of the machine 20 according to the embodiment will be explained. FIG. 2B is a diagram showing an example structure of the machine 20 according to the embodiment. Below, an example in which the machine 20 is an air conditioning apparatus will be described.

The machine 20, which is an air conditioning apparatus, includes various machines that constitute a refrigerant circuit 200, various sensors, and a control apparatus 40. Each machine constituting part of the refrigerant circuit 200 is controlled by the control apparatus 40. The refrigerant circuit 200 is, for example, a closed circuit filled with a refrigerant such as freon gas. The refrigerant circuit 200 may be configured such that, for example, the refrigerant circulates and forms a vapor compression refrigeration cycle.

A compressor 201, a four-way switching valve (a four-way valve, a switching valve, etc.) 202, an outdoor heat exchanger 203, an expansion valve (a reducing valve) 204, and an indoor heat exchanger 207 are connected to the refrigerant circuit 200. In the compressor 201, the discharging end is connected to the first port 2021 of the four-way switching valve 202, and the intake end is connected to the second port 2022 of the four-way switching valve 202. Also, in the refrigerant circuit 200, the outdoor heat exchanger 203, the expansion valve 204, and the indoor heat exchanger 207 are arranged such that the refrigerant having passed through the third port 2023 of the four-way switching valve 202 passes through the outdoor heat exchanger 203, the expansion valve 204, and the indoor heat exchanger 207, in order, and heads toward the fourth port 2024 of the four-way switching valve 202.

The compressor 201 may be, for example, a fully enclosed, variable-capacity type. The compressor 201 takes in, compresses, and discharges the refrigerant. For example, the capacity of the compressor 201 can be changed by changing the frequency of the alternating current supplied to the motor (not shown) of the compressor 201 and changing the rotational speed of the motor (the rotational speed of the compressor 201). Note that the speed of rotation may be, for example, the number of rotations per unit time.

In the outdoor heat exchanger 203, the outside air taken in by an outdoor fan 208 and the refrigerant exchange heat. In the indoor heat exchanger 207 provided in the indoor unit, the room air taken in by an indoor fan 209 and the refrigerant exchange heat. The indoor fan 209 may be, for example, a columnar fan (cross-flow fan) that rotates an impeller tilted forward in the direction of rotation, to suck in the air from an inlet and discharge it from an outlet. The room air is taken in the indoor unit as the indoor fan 209 rotates, and the air, having its temperature and the like controlled, is discharged into the room.

The expansion valve 204 may be, for example, an electronic expansion valve, where its degree of opening (the size of the hole) is adjusted by driving a valve body (not shown) with a pulse motor (not shown).

The four-way switching valve 202 is a valve that can switch between a first state, in which the first port 2021 and the third port 2023 communicate and the second port 2022 and the fourth port 2024 communicate (the state shown by the solid line in FIG. 1), and a second state, in which the first port 2021 and the fourth port 2024 communicate and the second port 2022 and the third port 2023 communicate (the state indicated by the dashed line in FIG. 1). The control apparatus 40 controls the four-way switching valve 202 and switches between the first state and the second state, thereby switching between the cooling operation for cooling the room in which the indoor unit is installed, and the heating operation for heating the room.

The compressor 201, the four-way switching valve 202, the outdoor heat exchanger 203, and the outdoor fan 208 may be accommodated in the casing of the outdoor unit (not shown). Also, the control apparatus 40, the expansion valve 204, the indoor heat exchanger 207, and the indoor fan 209 may be accommodated in the casing of the indoor unit (not shown). Note that the expansion valve 204 may be accommodated in the casing of the outdoor unit.

During the cooling operation, the four-way switching valve 202 is set to the first state. When the compressor 201 is run in this state, the outdoor heat exchanger 203 functions as a condenser (heat sink), and the indoor heat exchanger 207 functions as an evaporator, thus forming the cycle of refrigeration. In this case, the refrigerant discharged from the compressor 201 flows to the outdoor heat exchanger 203 and dissipates the heat to the outside air. Then, the refrigerant, rid of the heat, expands (gets depressurized) when passing through the expansion valve 204, and flows to the indoor heat exchanger 207. In the indoor heat exchanger 207, the refrigerant absorbs the heat from the room air and evaporates, and the cooled room air is supplied to the room. The evaporated refrigerant is drawn in the compressor 201 and compressed.

During the heating operation, the four-way switching valve 202 is set to the second state. When the compressor 201 is run in this state, the indoor heat exchanger 207 functions as a condenser (heat sink), and the outdoor heat exchanger 203 functions as an evaporator, thus forming the cycle of refrigeration. In this case, the refrigerant discharged from the compressor 201 flows to the indoor heat exchanger 207 and dissipates the heat to the room air. By this means, heated room air is supplied in the room. The refrigerant, rid of the heat, expands (gets depressurized) when passing through the expansion valve 204. The refrigerant expanded by the expansion valve 204 flows into the outdoor heat exchanger 203, absorbs the heat from the outside air, and evaporates. The evaporated refrigerant is drawn in the compressor 201 and compressed.

<Functional Structure>

Next, referring to FIG. 3, the functional structure of the information processing system 1 according to the embodiment will be described. FIG. 3 is a diagram that shows an example functional structure of the information processing apparatus 10 according to the embodiment.

<<Information Processing Apparatus 10A>>

The information processing apparatus 10A includes an acquiring part 11, a generation part 12, and an output part 13. Each of these parts may be implemented by, for example, cooperation of one or more programs installed in the information processing apparatus 10A, with the CPU 101, the ROM 102, the RAM 103, and so forth of the information processing apparatus 10A.

The acquiring part 11 acquires various data from the memory of the external apparatus and the memory of the information processing apparatus 10A. The acquiring part 11 acquires data for performing machine learning, for example.

The generation part 12 generates a trained model by performing machine learning based on the data acquired by the acquiring part 11.

The output part 13 outputs various information. The output part 13, for example, transmits (delivers) the trained model generated by the generation part 12, to the information processing apparatus 10B.

<<Information Processing Apparatus 10B>>

The information processing apparatus 10B includes an acquisition part 21, an inference part 22, and an output part 23. Each of these parts may be implemented by, for example, cooperation of one or more programs installed in the information processing apparatus 10B, with the CPU 101, the ROM 102, the RAM 103, and so forth of the information processing apparatus 10B.

The acquisition part 21 acquires various data from the memory of the external apparatus and the memory of the information processing apparatus 10B. The acquisition part 21 acquires, for example, the trained model from the information processing apparatus 10A. Also, the acquisition part 21 acquires, for example, the data (test data) for making inferences based on the trained model.

The inference part 22 makes inferences based on the trained model and the test data acquired by the acquisition part 21. The inference part 22 may, for example, perform failure prediction, failure diagnosis, demand prediction, and indoor environment prediction such as room temperature prediction, based on the trained model and the test data acquired by the acquisition part 21. The output part 23 performs notification and control based on the inference results from the inference part 22.

<Process>

<<Process Upon Learning>>

Figure 4:
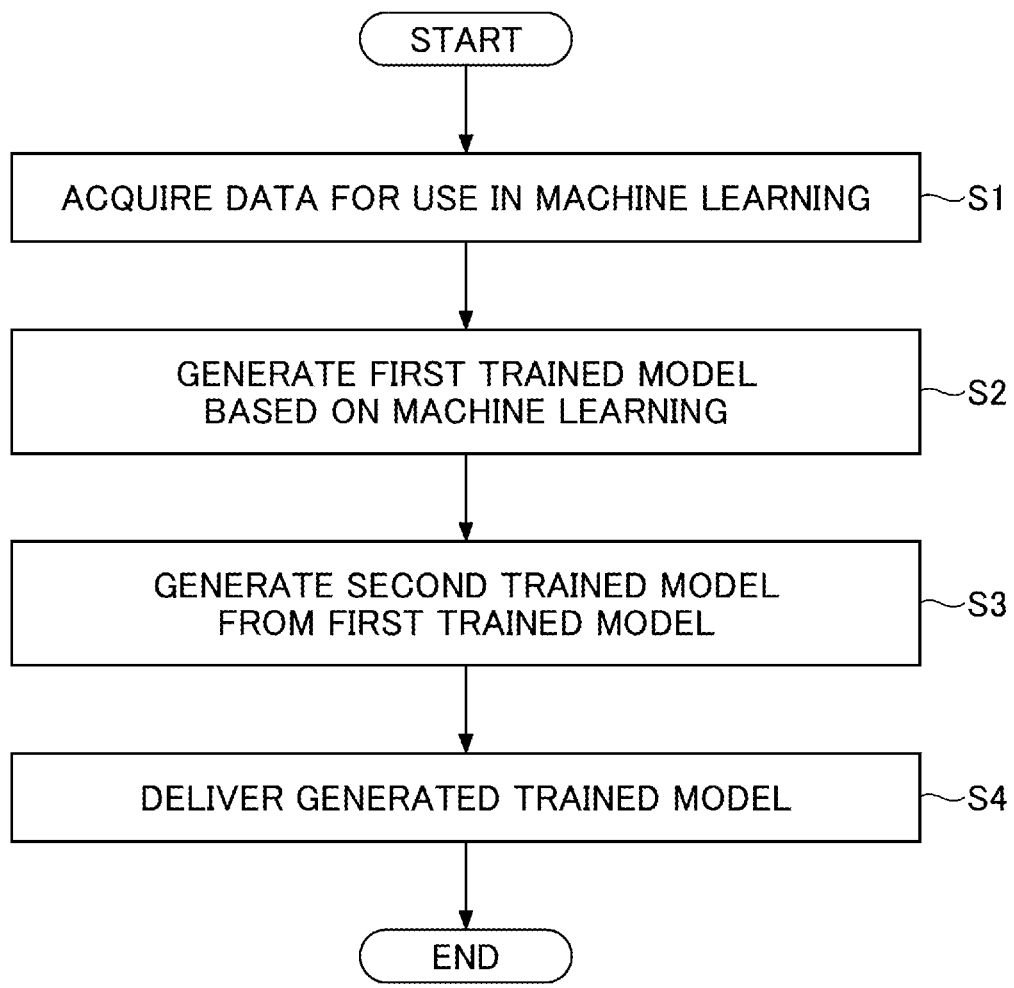
FIG. 4 is a flowchart that illustrates an example of a process executed upon learning by the information processing apparatus according to the embodiment.

An example of the process upon learning by the information processing apparatus 10A according to the embodiment will be described with reference to FIG. 4 and FIG. 5. FIG. 4 is a flowchart that shows an example of the process upon learning by the information processing apparatus 10A according to the embodiment. FIG. 5 is a diagram that explains examples of training data according to the embodiment.

In step S1, the acquiring part 11 of the information processing apparatus 10A acquires the first training data (learning data, training data, etc.) 501 shown in FIG. 5. In the example of FIG. 5, the first training data 501 includes ground-truth-labeled measurement data 511 and 521 (measurement data with ground-truth labels) and ground-truth-unlabeled measurement data 512 and 522.

The ground-truth-labeled measurement data 511 is the ground-truth-labeled measurement data of the inference-target machine 20A. Also, the ground-truth-labeled measurement data 521 is the ground-truth-labeled measurement data of the machines 20 (the machines 20B, 20C, and 20D) other than the machine 20A.

The ground-truth-labeled measurement data 511 and 521 include the data of sets of measurement data and ground-truth labels, associated with sets of machine IDs and dates/times. The machine IDs are the identification information of the machines 20. The dates/times are the respective dates and times the corresponding measurement data was measured. The measurement data is, for example, various data measured by the machines 20. The ground-truth labels are data that is set by a maintenance person or the like in association with the measurement data.

The ground-truth-unlabeled measurement data 512 and 522 differ from the ground-truth-labeled measurement data 511 and 521 in that no ground-truth label is set. The ground-truth-unlabeled measurement data 512 and 522 include measurement data associated with respective sets of machine IDs and dates/times.

The ground-truth-unlabeled measurement data 512 is the ground-truth-unlabeled measurement data of the inference-target machine 20A. The ground-truth-unlabeled measurement data 522 is the ground-truth-unlabeled measurement data of the machines 20 other than the machine 20A.

(About Measurement Data)

The measurement data included in the first training data 501 may include, for example, information about the room temperature, the room humidity, the outside temperature, the outside humidity, and the air-conditioning load pertaining to each machine 20, which is an air conditioning apparatus, as well as information about power consumption. The room temperature is the temperature in the room where each machine 20 is installed, as measured by the temperature sensor of the indoor unit of each machine 20. The room humidity is the humidity in the room. The outside temperature is the temperature outside the building (outside the room, outdoor, etc.) in which each machine 20 is installed. The outside humidity is the humidity outside the room.

The information about the air-conditioning load is information about the circumstances that have an impact on the air-conditioning load when the machines 20 are run. The information about the air-conditioning load may include, for example, at least one of the amount of insolation and the number of people in the room. The amount of insolation is the amount of insolation outside the room. The amount of insolation may be detected by, for example, an insolation sensor provided in the outdoor unit of each machine 20. The number of people in the room is the number of users in the room. The number of people in the room may be estimated by AI based on, for example, images captured by the camera provided in the indoor unit of each machine 20. Alternatively, the number of people in the room may be obtained from, for example, an office entrance/exit management system.

The information (value) about power consumption is information related to the power consumed during the operation of each machine 20. The information related to power consumption may include, for example, information that indicates at least one of: the power consumption integrated value; the power consumption peak value; the current value; the high pressure; the low pressure; the rotational speed of the compressor; and the operating efficiency of the compressor.

The power consumption integrated value is, for example, the integrated value of power consumption in each machine 20 in a predetermined period of time (for example, the most recent 10 minutes). The power consumption peak value is, for example, the peak value of power consumption in each machine 20 in a predetermined period of time. The current value is, for example, the average value of electric current in each machine 20 in a predetermined period of time.

The high pressure is the average value of high pressures in each machine 20 in a predetermined period of time. Note that the high pressure here refers to the high pressure in the refrigeration cycle of each machine 20 (hereinafter also simply referred to as "high pressure" as appropriate), and may be, for example, the pressure of the refrigerant compressed and discharged from the compressor 201 (the discharge pressure of the compressor 201), or may be the pressure of the refrigerant in the condenser.

The low pressure is the average value of low pressures in each machine 20 in a predetermined period of time. Note that the low pressure here refers to the low pressure in the refrigeration cycle of each machine 20 (hereinafter also simply referred to as "low pressure" as appropriate), and may be, for example, the pressure of the refrigerant drawn in the compressor 201 (the pressure of the refrigerant before being compressed by the compressor 201).

The operating efficiency of the compressor 201 is, for example, the efficiency of compressing the refrigerant with predetermined power consumption. The operating efficiency of the compressor 201 is maximized, for example, when the rotational speed of the compressor 201 is a predetermined value. For example, when the air-conditioning load is excessively low because the difference between the room temperature and the set temperature is small and the rotational speed of the compressor 201 is made very low for the cooling operation or the heating operation, the operating efficiency of the compressor 201 becomes excessively low. Also, for example, when the air-conditioning load is excessively high due to a large difference between the room temperature and the set temperature and the rotational speed of the compressor 201 is set very high for the cooling operation or the heating operation, the operating efficiency of the compressor 201 becomes excessively low.

Also, the measurement data to be included in the first training data 501 may include, for example: the degree of opening of the expansion valve 204 of the outdoor unit; the degree of opening of the expansion valve of the indoor unit; the current index of the compressor; the degree of discharge superheat of the compressor 201; the degree of suction superheat of the compressor 201; and the temperature of a supercooling heat exchanger.

The degree of opening of the expansion valve 204 of the outdoor unit refers to the degree of opening of the expansion valve 204 associated with the outdoor heat exchanger 203.

The degree of opening of the expansion valve of the indoor unit is the degree of opening of an expansion valve (not shown) that is provided in association with the indoor heat exchanger 207 on the refrigerant circuit 200. Note that, in the event the machines 20 are a multi-air conditioner system in which a plurality of indoor units are connected to one outdoor unit, the refrigerant circuit 200 may be connected with the indoor heat exchanger of each indoor unit and the expansion valve of each indoor unit.

The current index of the compressor is the value of the ratio between a predicted value of current in the compressor 201 and the actual measurement value. For example, when an anomaly occurs, such as when the humidity of the refrigerant (refrigerant gas) drawn into the compressor 201 exceeds a threshold, the current index of the compressor may deteriorate (increase in value) suddenly.

The degree of discharge superheat of the compressor 201 is the degree of superheat of the refrigerant discharged from the compressor 201. For example, the degree of discharge superheat may be obtained, at the pressure (high pressure) of the refrigerant discharged from the compressor 201, from the value of the difference between: the temperature at the boundary between the temperature range in which the refrigerant contains both liquid and gas and the temperature range in which the refrigerant contains only gas; and the temperature of the refrigerant discharged from the compressor 201.

The degree of suction superheat of the compressor 201 is the degree of superheat of the refrigerant drawn in the compressor 201. For example, the degree of suction superheat may be obtained, at the pressure (low pressure) of the refrigerant drawn in the compressor 201, from the value of the difference between: the temperature at the boundary between the temperature range in which the refrigerant contains both liquid and gas and the temperature range in which the refrigerant contains only gas; and the temperature of the refrigerant drawn in the compressor 201.

Note that, when the degree of discharge superheat of the compressor 201 is less than or equal to a threshold, or when the degree of suction superheat of the compressor 201 is less than or equal to a threshold, the compressor 201 is likely to be sucking in the refrigerant containing both liquid and gas.

The temperature of the supercooling heat exchanger is the temperature of the refrigerant supercooled by the supercooling heat exchanger. The temperature of the supercooling heat exchanger is, for example, the temperature of the refrigerant supplied from a refrigerant amount adjusting container (receiver, accumulator, etc.) provided on the refrigerant circuit 200, and supercooled by the supercooling heat exchanger. The temperature of the supercooling heat exchanger may be measured, for example, by a temperature sensor provided at the outlet of the supercooling heat exchanger. Note that the receiver is a container for accumulating the liquid of the refrigerant condensed in the condenser. By means of the receiver, for example, the refrigerant's liquid can be accumulated temporarily when the amount of refrigerant in the evaporator changes due to variation of the air-conditioning load. The accumulator is an apparatus that separates the liquid and the gas of the refrigerant drawn in the compressor 201, and allows the compressor 201 to suck in the gas alone.

Subsequently, the generation part 12 of the information processing apparatus 10A performs machine learning based on the acquired first training data, and generates a first trained model (step S2). Here, the generation part 12 may perform semi-supervised learning based on the first training data, for example. By this means, for example, proper learning can be carried out even when the inference-target machine 20A is installed in a newly contracted property, in which the inference-target machine 20A started running only recently and therefore has a relatively small amount of ground-truth-labeled measurement data.

Also, for example, when the number of records in the ground-truth-labeled measurement data 511 of the inference-target machine 20A is greater than or equal to a threshold, the generation part 12 may perform supervised learning based on the ground-truth-labeled measurement data 511. By this means, when the amount of ground-truth-labeled measurement data 511 is small, semi-supervised learning can be carried out.

(Example of Semi-Supervised Learning by Bootstrapping)

The generation part 12 may perform semi-supervised learning based on, for example, bootstrapping. In this case, the generation part 12 may perform semi-supervised learning based on, for example, self-training using one classifier, or perform semi-supervised learning based on co-training using a plurality of classifiers.

In this case, the generation part 12 may perform following steps (1) to (6).

(1) First, a trained model A may be generated by performing machine learning in supervised learning based on the ground-truth-labeled measurement data 511 of the machine 20A. Here, the generation part 12 may perform machine learning based on, for example, a neural network, an SVM (Support Vector Machine), logistic regression, random forest, the k-nearest neighbor method, and the like.

(2) Then, the generation part 12 may infer the ground-truth labels for the ground-truth-unlabeled measurement data 512 of the machine 20A based on the trained model A, obtained as a result of the above machine learning.

(3) Then, among the ground-truth-unlabeled measurement data 512 of the machine 20A, the generation part 12 sets the inferred ground-truth labels only with respect to the data, the reliability value of which, calculated upon inference, is greater than or equal to a threshold.

Then, the generation part 12 may repeat following steps (4) to (6). In this case, the generation part 12 may finish the process when, for example, the number of repetitions exceeds a threshold, and when, among the ground-truth-unlabeled measurement data 512 of the machine 20A, the proportion of measurement data, for which no inferred ground-truth label is set yet, falls down to or below a threshold.

(4) The generation part 12 generates (updates) a trained model B (first trained model) by performing machine learning in supervised learning based on the ground-truth-labeled measurement data 511 of the machine 20A, and the measurement data, for which inferred ground-truth labels are set, among the ground-truth-unlabeled measurement data 512 of the machine 20A.

(5) Then, based on the result of this machine learning, the generation part 12 infers the ground-truth labels for the measurement data, for which no inferred ground-truth label is set yet, among the ground-truth-unlabeled measurement data 512 of the machine 20A.

(6) Then, among the ground-truth-unlabeled measurement data 512 of the inference-target machine 20A, the generation part 12 assigns the inferred ground-truth labels only to the data, the reliability value of which, calculated upon inference, is greater than or equal to a threshold.

(Example of Semi-Supervised Learning Based on Graph-Based Algorithm)

The generation part 12 may, for example, perform semi-supervised learning based on a graph-based algorithm. In this case, the generation part 12 may perform semi-supervised learning based on, for example, a semi-supervised k-nearest neighbor graph or a semi-supervised Gaussian mixture model.

(Example of Machine Learning Based on Measurement Data Pertaining To Machines 20 Other Than Inference-Target Machine 20A)

The generation part 12 may perform machine learning based on measurement data pertaining to machines 20 other than the inference-target machine 20A. In this case, based on the result of machine learning in the above-described step (5), the generation part 12 may, for example, infer the ground-truth labels for the measurement data, for which no inferred ground-truth label is set yet, among the measurement data included in the first training data and not used in supervised learning. By this means, it is possible to use measurement data, to which no ground-truth label has been assigned by a maintenance person or the like, in semi-supervised learning, so that more appropriate learning is possible.

Also, for example, when there is not a sufficient amount of data for a newly installed or additionally installed machine 20A due to expansion or renewal of contract, learning can be carried out by using the data of the existing machine 20B and the like in the same room or floor. Also, if there is only an insufficient amount of data of the machine 20A because the owner of the machine 20A does not use various machine-learning-based services or the like, the data of the machine 20B installed on another floor of the same property can be used for learning.

In this case, the measurement data that is included in the first training data but not used for supervised learning may include: measurement data included in the ground-truth-labeled measurement data 521 of the machines 20 other than the inference-target machine 20A; and each measurement data included in the ground-truth-unlabeled measurement data 522 of the machines 20 other than the machine 20A and the ground-truth-unlabeled measurement data 512 of the machine 20A.

Note that, for example, in the event the number of records in the ground-truth-unlabeled measurement data 512 of the inference-target machine 20A is less than or equal to a threshold, the generation part 12 may perform machine learning based also on measurement data pertaining to the machines 20 other than the inference-target machine 20A. By this means, when the amount of ground-truth-unlabeled measurement data 512 is insufficient, it is still possible to perform semi-supervised learning by additionally using measurement data of other machines 20.

(Inferences Obtained by Using Mapping Between Machine 20A and Other Machines 20)

The generation part 12 may perform machine learning by using mapping of the ground-truth-labeled measurement data 511 of the inference-target machine 20A, and the ground-truth-labeled measurement data 521 of the machines 20 other than the machine 20A. In this case, instead of above-described steps (1) and (2), the following steps (1A), (1B), and (2A) may be performed.

(1A) First, the generation part 12 may generate a trained model C in supervised learning based on the ground-truth-labeled measurement data 521 of the machines 20 other than the machine 20A.

(1B) Also, the generation part 12 may calculate mapping information that shows mapping of the around-truth-labeled measurement data 511 of the inference-target machine 20A, and the ground-truth-labeled measurement data 521 of the machines 20 other than the machine 20A. Here, the generation part 12 may calculate, for example, a mapping function that transforms a set of ground-truth-labeled measurement data 521 of the machines 20 other than the machine 20A, into a set of ground-truth-labeled measurement data 511 of the machine 20A.

(2A) Then, the generation part 12 may transform the measurement data included in the ground-truth-unlabeled measurement data 512 of the machine 20A by using the mapping function, and enter the transformed measurement data in the trained model C, so as to infer the ground-truth labels for the ground-truth-unlabeled measurement data 512 of the machine 20A.

Following this, the generation part 12 of the information processing apparatus 10A generates a pruned second trained model based on the first trained model generated above (step S3). By this means, the data size of the second trained model to be delivered to the information processing apparatus 10B can be reduced, and, consequently, the cost of communication can be reduced. Also, it is possible to make inferences even when the processing capacity of the information processing apparatus 10B is low.

Here, the generation part 12 may generate the second trained model by using a model compression technique such as distillation. In the second trained model, at least one of the data size, the number of input data items, and the number of network layers may be reduced compared to the first trained model.

In this case, the generation part 12 may generate the second trained model based on, for example, inference results that are calculated by entering each measurement data included in the first training data 501, in the first trained model. For example, in the event of a classification problem, each inference result may be the probability value by which each measurement data is classified into a certain class.

Then, using the inference result for each estimated data as the ground-truth label for each estimated data, the generation part 12 may perform machine learning based on supervised learning that specifies a network structure in which at least one of the number of input data items and the number of network layers is reduced compared to the first trained model.

Following this, the output part 13 of the information processing apparatus 10A transmits the second trained model, generated in the generation part 12, to the information processing apparatus 10B (step S4). Here, if, for example, a request is received from the information processing apparatus 10B, the output part 13 may allow the information processing apparatus 10B to download the second trained model.

<<Process Upon Inference>>

Figure 6:
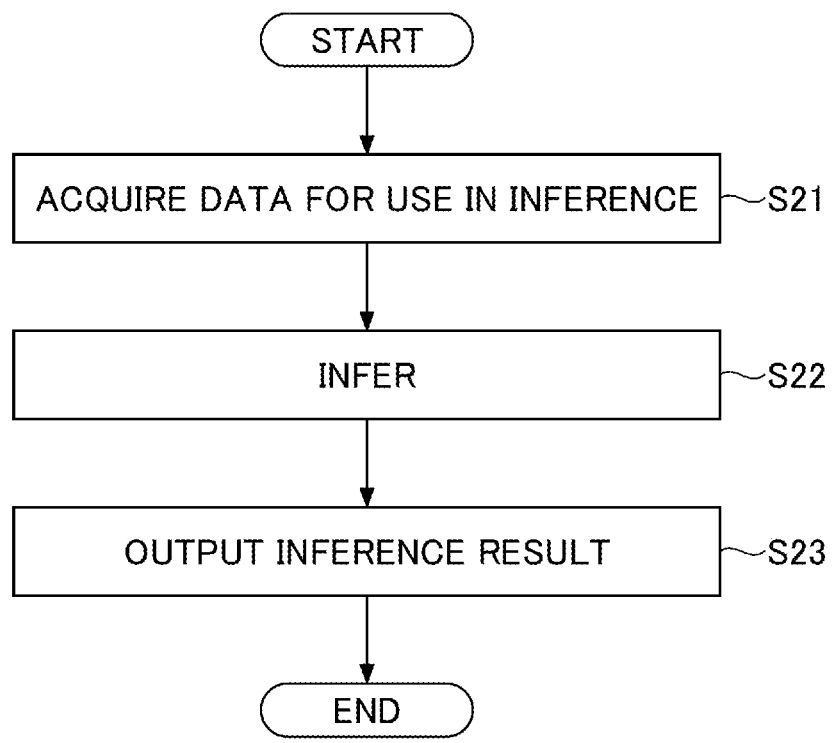
FIG. 6 is a flowchart that illustrates an example of a process executed upon inference by the information processing apparatus according to the embodiment.

Next, an example of the process upon inference by the information processing apparatus 10B according to the embodiment will be described with reference to FIG. 6. FIG. 6 is a flowchart that shows an example of the process upon inference by the information processing apparatus 10B according to the embodiment.

In step S21, the acquisition part 21 of the information processing apparatus 10B acquires the trained model generated by the information processing apparatus 10A and the measurement data of the machine 20A. Here, the measurement data of the machine 20A that the acquisition part 21 acquires has the same items of data as the measurement data included in the first training data 501 of FIG. 5.

Subsequently, the inference part 22 of the information processing apparatus 10B makes inferences (predictions) about the measurement data of the machine 20A based on this trained model and the measurement data of the machine 20A acquired by the acquisition part 21 (step S22). Subsequently, the output part 23 of the information processing apparatus 10B outputs the result inferred by the inference part 22 (step S23).

MODIFICATIONS

Each functional part of the information processing apparatus 10A and the information processing apparatus 10B may be implemented by, for example, cloud computing provided by one or more computers. Also, the processes that the information processing apparatus 10A and the information processing apparatus 10B perform may be in part executed by another information processing apparatus.

Although an embodiment has been described above, it should be understood that various changes in form and detail may be made without departing from the spirit and scope of the claims.

This international application is based on and claims priority to Japanese Patent Application No. 2020-149445, filed on Sep. 4, 2020, the entire contents of which are incorporated herein by reference.

REFERENCE SIGNS LIST 1 information processing system
10A information processing apparatus
11 acquisition part
12 generation part
13 output part
10B information processing apparatus
21 acquisition part
22 inference part
23 output part

The invention claimed is:

1. A generation method performed by an information processing apparatus, comprising:
  acquiring
    a data set including
      first combined data that are a combination of first measurement data, which are related to first measured data of a first air conditioning apparatus, and labels set for the first measurement data, and second measurement data being unlabeled and related to second measured data of the first air conditioning apparatus, and
      second combined data that are a combination of third measurement data and labels set for the third measurement data, the third measurement data being related to a second air conditioning apparatus;
  generating, based on the acquired second combined data, a second trained model for inferring labels for the third measurement data;
  calculating mapping information that shows mapping of the first combined data and the second combined data, the mapping information including a function for transforming the second combined data into the first combined data;
wherein the function transforms a set of ground-truth-labeled measurement data of the second trained model into a set of ground-truth-labeled measurement data of a first trained model;
wherein the set of ground-truth-labeled measurement data of the second trained model is part of the second combined data;
wherein the set of ground-truth-labeled measurement data of the first trained model is part of the first combined data;
acquiring data transformed from the second measurement data based on the calculated mapping information;
inferring labels set for the second measurement data by inputting the acquired data into the generated second trained model;
obtaining a combination of the second measurement data and the inferred labels set for the second measurement data;
generating, based on the first combined data and the obtained combination of the second measurement data and the inferred labels set for the second measurement data, the first trained model for inferring labels for the first measurement data, the first trained model not inferring labels for the third measurement data;
inputting the first measurement data into the generated first trained model;
acquiring inferred result data output from the generated first trained model as a result of the inputting; and
controlling the first air conditioning apparatus based on the inferred result data.

2. The generation method according to claim 1, wherein a data size, a number of input data items, or a number of network layers of the generated second trained model are less than that of the first trained model.

3. The generation method according to claim 1, wherein the first measurement data includes at least one of room temperature, room humidity, outside temperature, outside humidity, information related to air-conditioning load, or information related to power consumption that pertains to the first air conditioning apparatus.

4. The generation method according to claim 1, wherein the first measurement data includes at least one of a degree of opening of an expansion valve of an outdoor unit, a degree of opening of an expansion valve of an indoor unit, a value of a ratio between a predicted value of a current in a compressor and an actual measurement value, a degree of discharge superheat of the compressor, a degree of suction superheat of the compressor, or a temperature of a super-cooling heat exchanger.

5. An information processing apparatus comprising a memory and a processor coupled to the memory, wherein the processor is configured to:
acquire
a data set including
first combined data that are a combination of first measurement data, which are related to first measured data of a first air conditioning apparatus, and labels set for the first measurement data, and second measurement data being unlabeled and related to second measured data of the first air conditioning apparatus, and
second combined data that are a combination of third measurement data and labels set for the third measurement data, the third measurement data being related to a second air conditioning apparatus;
generate, based on the acquired second combined data, a second trained model for inferring labels for the third measurement data;
calculate mapping information that shows mapping of the first combined data and the second combined data, wherein the mapping information includes a function for transforming the second combined data into the first combined data;
wherein the function transforms a set of ground-truth-labeled measurement data of the second trained model into a set of ground-truth-labeled measurement data of a first trained model;
wherein the set of ground-truth-labeled measurement data of the second trained model is part of the second combined data;
wherein the set of ground-truth-labeled measurement data of the first trained model is part of the first combined data;
acquiring data transformed from the second measurement data based on the calculated mapping information;
infer labels set for the second measurement data by inputting the acquired data into the generated second trained model;
obtain a combination of the second measurement data and the inferred labels set for the second measurement data;
generate, based on the first combined data and the obtained combination of the second measurement data and the inferred labels set for the second measurement data, the first trained model for inferring labels for the first measurement data, the first trained model not inferring labels for the third measurement data;
input the first measurement data into the generated first trained model,
acquire inferred result data output from the generated first trained model as a result of the inputting, and
control the first air conditioning apparatus based on the inferred result data.

6. An information processing apparatus comprising a memory and a processor coupled to the memory, wherein the processor is configured to:
acquire a first trained model; and
infer, based on the first trained model, labels for first measurement data related to a first air conditioning apparatus,
wherein the processor is configured to generate the first trained model by
acquiring
a data set including
first combined data that are a combination of the first measurement data and labels set for the first measurement data, and second measurement data being unlabeled and related to second measured data of the first air conditioning apparatus, and
second combined data that are a combination of third measurement data and labels set for the third measurement data, the third measurement data being related to the second air conditioning apparatus,
generating, based on the acquired second combined data, a second trained model for inferring labels for the third measurement data;
calculating mapping information that shows mapping of the first combined data and the second combined data, the mapping information including a function for transforming the second combined data into the first combined data, wherein the function transforms a set of ground-truth-labeled measurement data of the second trained model into a set of ground-truth-labeled measurement data of the first trained model;

wherein the set of ground-truth-labeled measurement data of the second trained model is part of the second combined data;

wherein the set of ground-truth-labeled measurement data of the first trained model is part of the first combined data;

acquiring data transformed from the second measurement data based on the calculated mapping information;

inferring labels set for the second measurement data by inputting the acquired data into the generated second trained model;

obtaining a combination of the second measurement data and the inferred labels set for the second measurement data; and generating, based on the first combined data and the obtained combination of the second measurement data and the inferred labels set for the second measurement data; the first trained model not inferring labels for the third measurement data; and wherein the processor is further configured to:

input the first measurement data into the generated first trained model, acquire inferred result data output from the generated first trained model as a result of the inputting, and control the first air conditioning apparatus based on the inferred result data.

7. An information processing method performed by an information processing apparatus, comprising:

acquiring a first trained model; and inferring, based on the first trained model, labels for first measurement data related to a first air conditioning apparatus, wherein the first trained model is generated by
acquiring
a data set including
first combined data that are a combination of the first measurement data and labels set for the first measurement data, and second measurement data being unlabeled and related to second measured data of the first air conditioning apparatus, and
second combined data that are a combination of third measurement data and labels set for the third measurement data, the third measurement data being related to the second air conditioning apparatus, generating, based on the acquired second combined data, a second trained model for inferring labels for the third measurement data;

calculating mapping information that shows mapping of the first combined data and the second combined data, the mapping information including a function for transforming the second combined data into the first combined data, wherein the function transforms a set of ground-truth-labeled measurement data of the second trained model into a set of ground-truth-labeled measurement data of the first trained model;

wherein the set of ground-truth-labeled measurement data of the second trained model is part of the second combined data;

wherein the set of ground-truth-labeled measurement data of the first trained model is part of the first combined data;

acquiring data transformed from the second measurement data based on the calculated mapping information;

inferring labels set for the second measurement data by inputting the acquired data into the generated second trained model;

obtaining a combination of the second measurement data and the inferred labels set for the second measurement data; and generating, based on the first combined data and the obtained combination of the second measurement data and the inferred labels set for the second measurement data; the first trained model not inferring labels for the third measurement data; and wherein the method further comprises:
inputting the first measurement data into the generated first trained model,
acquiring inferred result data output from the generated first trained model as a result of the inputting, and
controlling the first air conditioning apparatus based on the inferred result data.

8. A first trained model for causing an information processing apparatus to perform a process for inferring labels for first measurement data related to the first air conditioning apparatus, the first trained model being generated by
acquiring
a data set including
first combined data that are a combination of the first measurement data and labels set for the first measurement data, and second measurement data being unlabeled and related to second measured data of the first air conditioning apparatus, and
second combined data that are a combination of third measurement data and labels set for the third measurement data, the third measurement data being related to the second air conditioning apparatus;

generating, based on the acquired second combined data, a second trained model for inferring labels for the third measurement data;

calculating mapping information that shows mapping of the first combined data and the second combined data, the mapping information including a function for transforming the second combined data into the first combined data;

wherein the function transforms a set of ground-truth-labeled measurement data of the second trained model into a set of ground-truth-labeled measurement data of the first trained model;

wherein the set of ground-truth-labeled measurement data of the second trained model is part of the second combined data;

wherein the set of ground-truth-labeled measurement data of the first trained model is part of the first combined data;

acquiring data transformed from the second measurement data based on the calculated mapping information;

inferring labels set for the second measurement data by inputting the acquired data into the generated second trained model;

obtaining a combination of the second measurement data and the inferred labels set for the second measurement data; and generating, based on the first combined data and the obtained combination of the second measurement data and the inferred labels set for the second measurement data; the first trained model not inferring labels for the third measurement data; and wherein inferred result data from the information processing apparatus is used for controlling the first air conditioning apparatus.

\* \* \* \* \*